United States Patent
Gummaraju et al.

(10) Patent No.: US 10,642,800 B2
(45) Date of Patent: May 5, 2020

(54) MULTI-TENANT DISTRIBUTED COMPUTING AND DATABASE

(71) Applicant: VMware, Inc., Palo Alto, CA (US)

(72) Inventors: Jayanth Gummaraju, San Francisco, CA (US); Yunshan Lu, San Jose, CA (US); Tariq Magdon-Ismail, San Jose, CA (US)

(73) Assignee: VMware, Inc., Palo Alto, CA (US)

(*) Notice: Subject to any disclaimer, the term of this patent is extended or adjusted under 35 U.S.C. 154(b) by 1368 days.

(21) Appl. No.: 14/329,132

(22) Filed: Jul. 11, 2014

(65) Prior Publication Data
US 2015/0121371 A1    Apr. 30, 2015

Related U.S. Application Data

(60) Provisional application No. 61/895,997, filed on Oct. 25, 2013.

(51) Int. Cl.
| | | |
|---|---|---|
| *G06F 16/182* | (2019.01) | |
| *G06F 16/27* | (2019.01) | |
| *G06F 9/455* | (2018.01) | |
| *G06F 16/188* | (2019.01) | |

(52) U.S. Cl.
CPC ........ *G06F 16/182* (2019.01); *G06F 9/45558* (2013.01); *G06F 16/188* (2019.01); *G06F 16/27* (2019.01); *G06F 2009/45562* (2013.01)

(58) Field of Classification Search
CPC ......... G06F 17/30194; G06F 17/30233; G06F 9/45558; G06F 9/45533; G06F 2009/45562; G06F 16/182; G06F 16/27; G06F 16/188
See application file for complete search history.

(56) References Cited

U.S. PATENT DOCUMENTS

| | | | | |
|---|---|---|---|---|
| 8,595,723 | B2* | 11/2013 | Garrett | G06F 9/44505 713/100 |
| 9,489,443 | B1* | 11/2016 | Muniswamy-Reddy | G06F 16/278 |
| 9,619,256 | B1* | 4/2017 | Natanzon | G06F 11/2097 |
| 9,658,872 | B1* | 5/2017 | Hanna | G06F 9/45558 |
| 2009/0288084 | A1* | 11/2009 | Astete | G06F 9/45533 718/1 |
| 2011/0088032 | A1* | 4/2011 | Garrett | G06F 9/44505 718/1 |
| 2012/0272238 | A1* | 10/2012 | Baron | G06F 9/45558 718/1 |
| 2013/0185337 | A1* | 7/2013 | Lipcon | G06F 3/0611 707/813 |

(Continued)

*Primary Examiner* — Grace Park
*Assistant Examiner* — Hubert Cheung
(74) *Attorney, Agent, or Firm* — Patterson + Sheridan, LLP (57) ABSTRACT

A distributed computing application is described that provides a highly elastic and multi-tenant platform for Hadoop applications and other workloads running in a virtualized environment. Deployments of a distributed computing application, such as Hadoop, may be executed concurrently with a distributed database application, such as HBase, using a shared instance of a distributed filesystem, or in other cases, multiple instances of the distributed filesystem. Computing resources allocated to region server nodes executing as VMs may be isolated from compute VMs of the distributed computing application, as well as from data nodes executing as VMs of the distributed filesystem.

20 Claims, 7 Drawing Sheets

(56) References Cited

U.S. PATENT DOCUMENTS

| | | | | |
|---|---|---|---|---|
| 2013/0227558 A1* | 8/2013 | Du | G06F 9/45558 | 718/1 |
| 2013/0227560 A1* | 8/2013 | McGrath | G06F 9/45558 | 718/1 |
| 2014/0137104 A1* | 5/2014 | Nelson | G06F 9/45558 | 718/1 |
| 2014/0185616 A1* | 7/2014 | Bloch | G06F 9/45533 | 370/392 |
| 2014/0188825 A1* | 7/2014 | Muthukkaruppan | G06F 16/134 | 707/694 |
| 2014/0245298 A1* | 8/2014 | Zhou | G06F 9/455 | 718/1 |
| 2015/0120791 A1* | 4/2015 | Gummaraju | G06F 17/30194 | 707/823 |
| 2015/0120928 A1* | 4/2015 | Gummaraju | H04L 67/1008 | 709/226 |
| 2017/0170988 A1* | 6/2017 | Mazarick | H04L 12/4641 | |

* cited by examiner

MULTI-TENANT DISTRIBUTED COMPUTING AND DATABASE

CROSS-REFERENCE TO RELATED APPLICATION(S)

This application claims the benefit of U.S. Provisional Patent Application No. 61/895,997, filed Oct. 25, 2013, the entire contents of which are incorporated by reference herein.

BACKGROUND

Distributed computing platforms, such as Hadoop or other MapReduce-related frameworks, include software that allocates computing tasks across a group, or "cluster," of distributed software components executed by a plurality of computing devices, enabling large workloads (e.g., data sets) to be processed in parallel and more quickly than is generally feasible with a single software instance or a single device. Such distributed computing platforms typically utilize a distributed file system that can support input/output-intensive distributed software components running on a large quantity (e.g., on the order of thousands) of computing devices to access a large quantity (e.g., petabytes) of data. For example, a data set to be analyzed by Hadoop may be stored within a Hadoop Distributed File System (HDFS) that is typically used in conjunction with Hadoop, which enables various computing devices running Hadoop software to simultaneously process different portions of the file.

SUMMARY

One or more embodiments disclosed herein provide a method for executing a distributed computing application within a virtualized computing environment for a plurality of tenants. The method includes instantiating a first plurality of virtual machines (VMs) on a plurality of hosts to form a first distributed filesystem accessible by a plurality of compute VMs. Each compute VM may be configured to process a portion of an input data set stored in the first distributed filesystem. The method further includes instantiating a second plurality of VMs on the plurality of hosts to form a second distributed filesystem accessible by a plurality of region server nodes associated with a distributed database application. Each region server node may be configured to serve a portion of a data table stored in the second distributed filesystem.

Further embodiments of the present disclosure include a non-transitory computer-readable storage medium that includes instructions that enable a processing unit to implement one or more of the methods set forth above or the functions of the computer system set forth above.

DETAILED DESCRIPTION

One or more embodiments disclosed herein provide methods, systems, and computer programs for executing a distributed computing application, such as Hadoop, in a virtualized environment. Data nodes and compute nodes are separated into different virtual machines (VMs) to allow compute nodes to elastically scale based on needs of the distributed computing application. In one embodiment, deployments of a distributed computing application, such as Hadoop, may be executed concurrently with a distributed database application, such as HBase, using a shared instance of a distributed filesystem, or in other cases, multiple instances of the distributed filesystem. Computing resources allocated to region server nodes executing as VMs may be isolated from compute VMs of the distributed computing application, as well as from data nodes executing as VMs of the distributed filesystem.

Figure 1:
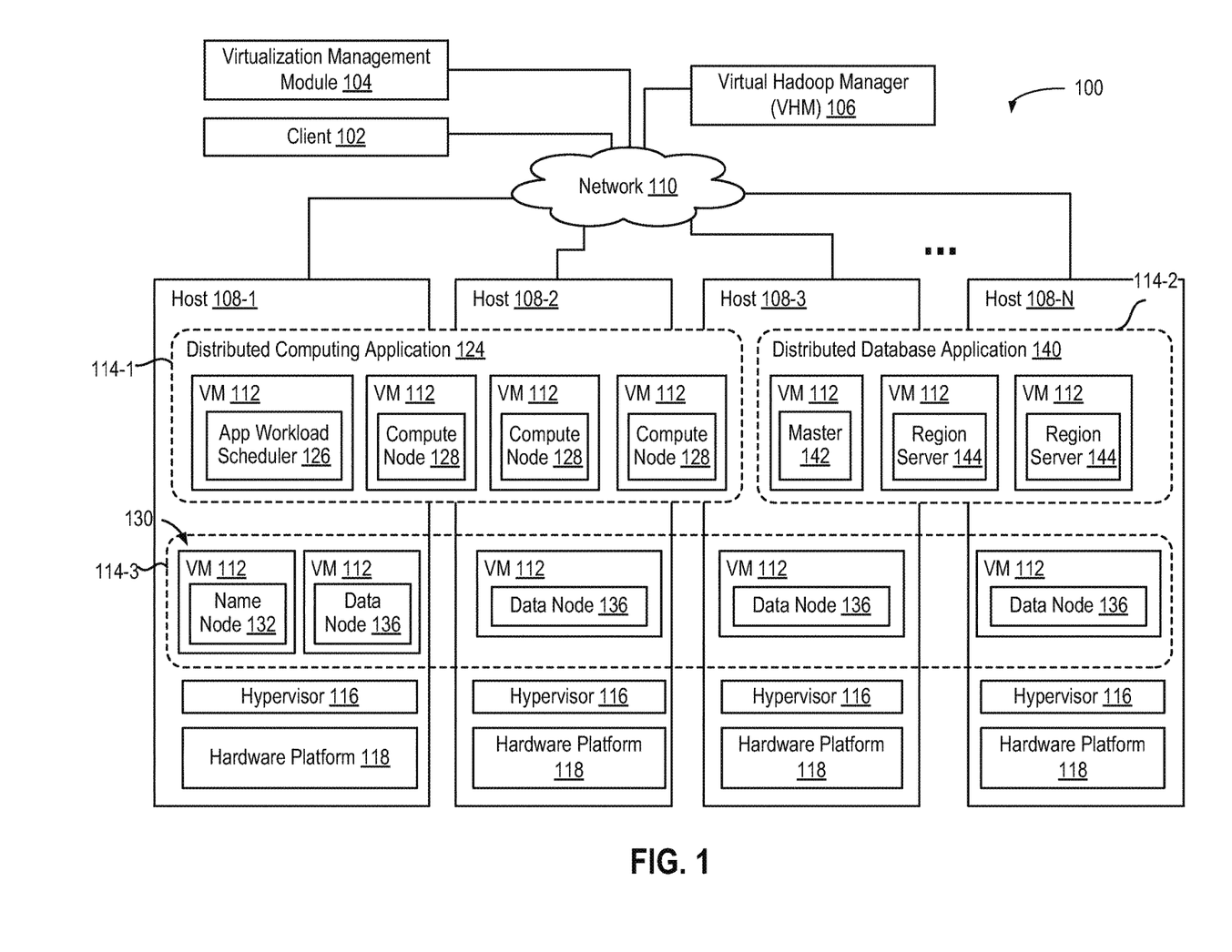
FIG. 1 is a block diagram that illustrates a virtualized computing system with which one or more embodiments of the present disclosure may be utilized.

FIG. 1 is a block diagram that illustrates a computing system 100 with which one or more embodiments of the present disclosure may be utilized. As illustrated, computing system 100 includes a plurality of host computers, identified as hosts 108-1, 108-2, 108-3, and 108-4, and referred to collectively as hosts 108. Each host 108 is configured to provide a virtualization layer that abstracts processor, memory, storage, and networking resources of a hardware platform 118 into multiple virtual machines (VMs) 112 that run concurrently on the same host 108. VMs 112 run on top of a software interface layer, referred to herein as a hypervisor 116, that enables sharing of the hardware resources of host 108 by the VMs 112. One example of hypervisor 116 that may be used in an embodiment described herein is a VMware ESXi hypervisor provided as part of the VMware vSphere solution made commercially available from VMware, Inc.

In one embodiment, VMs 112 may be organized into a plurality of resource pools, identified as resource pool 114-1, 114-2, and 114-3, which logically partitions available resources of hardware platforms 118, such as CPU and memory. Resource pools 114 may be grouped into hierarchies; resource pools 114 provide resources to "child" resource pools and virtual machines. Resource pools 114 enable a system administrator to organize resources of computing system 100, isolate VMs and computing resources from one resource pool to another, abstract resources from the actual hosts 108 that contribute the resources, and manage sets of VMs 112 associated with a resource pool 114. For example, a system administrator may control the aggregate allocation of resources to the set of VMs 112 by changing settings on the VMs' enclosing resource pool 114.

As shown, VMs 112 of hosts 108 may be provisioned and used to execute a number of workloads that deliver information technology services, including web services, database services, data processing services, and directory services. In one embodiment, one or more VMs 112 are configured to serve as a node of a cluster generated and managed by a distributed computing application 124 configured to elastically distribute its workload over a plurality of VMs that acts as nodes of the distributed computing application. Distributed computing application 124 may be configured to incorporate additional VMs or releasing unused VMs from its cluster—thereby growing and shrinking its profile within computing system 100. VMs 112 executing as nodes of distributed computing application 124 are shown in greater detail in FIG. 2.

Figure 2:
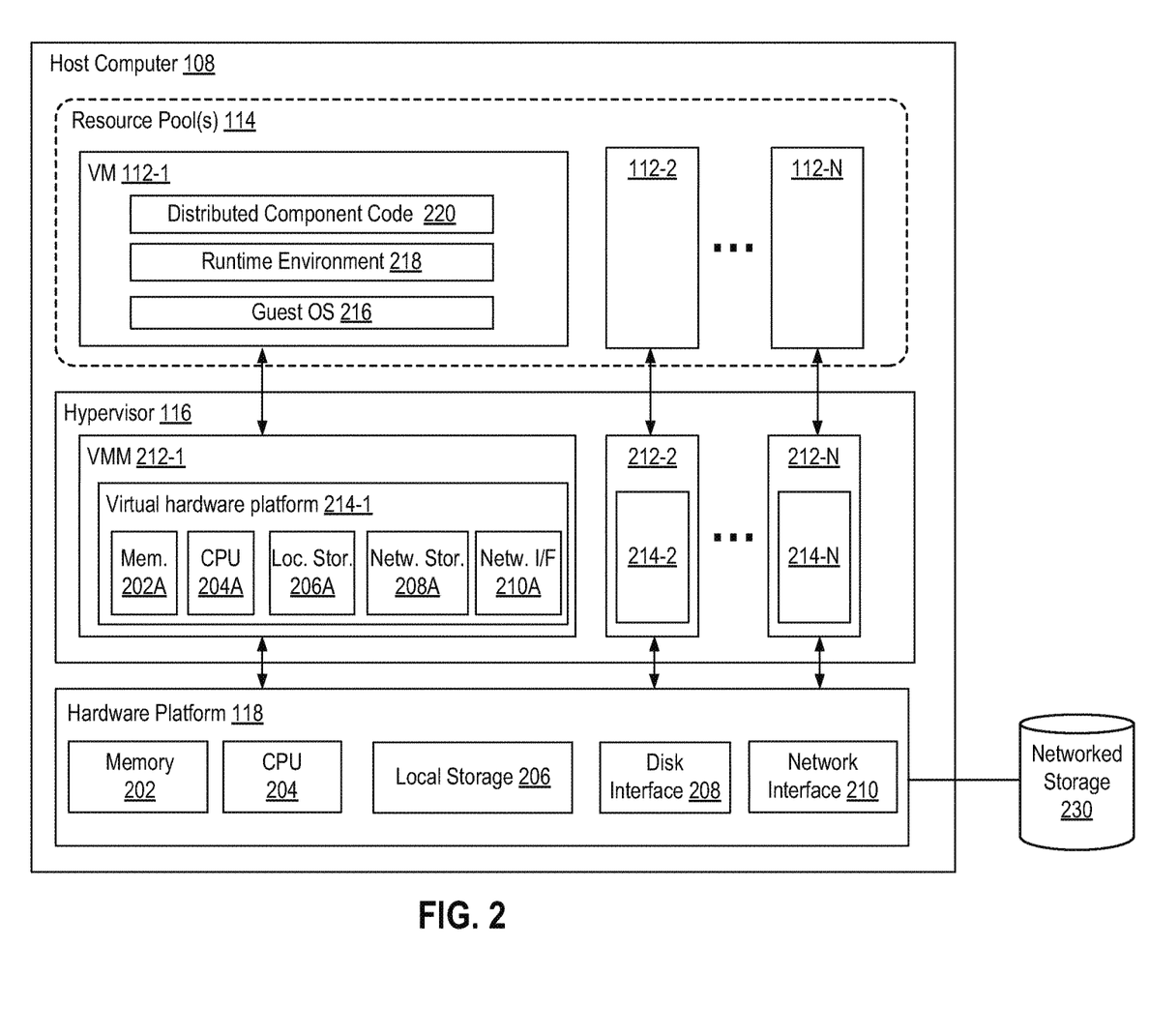
FIG. 2 is a block diagram that illustrates a host computer supporting one or more virtual machines, according to one embodiment of the present disclosure.

FIG. 2 is a block diagram that illustrates a host computer 108 supporting one or more virtual machines 112, according to one embodiment of the present disclosure. As shown, hardware platform 118 of each host 108 may include conventional components of a computing device, such as a memory 202, a processor 204, local storage 206, a disk interface 208, and a network interface 210. Processor 204 is configured to execute instructions, for example, executable instructions that perform one or more operations described herein and may be stored in memory 202 and in local storage 206. Memory 202 and local storage 206 are devices allowing information, such as executable instructions, cryptographic keys, virtual disks, configurations, and other data, to be stored and retrieved. Memory 202 may include, for example, one or more random access memory (RAM) modules; local storage 206 may include, for example, one or more hard disks, flash memory modules, solid state disks, and optical disks. Disk interface 208 enables host 108 to communicate with one or more network data storage systems that may, for example, store "virtual disks" that are accessed by VM nodes. Examples of disk interface 208 are a host bus adapter (HBA) that couples host 108 to a storage area network (SAN) or a network file system interface, depicted as networked storage 230. Network interface 210 enables host 108 to communicate with another device via a communication medium, such as network 110. An example of network interface 210 is a network adapter, also referred to as a Network Interface Card (NIC). In some embodiments, a plurality of NICs is included in network interface 210.

As described earlier, virtual machines (e.g., VMs 112-1 to 112-N) run on top of a hypervisor 116 that enables sharing of the resources of hardware platform 118 of host 108 by the virtual machines. Hypervisor 116 may run on top of the operating system of host 108 or directly on hardware components of host 108. Hypervisor 116 provides a device driver layer configured to map physical resource of hardware platforms 118 to "virtual" resources of each VM 112 such that each VM 112-1 to 112-N has its own corresponding virtual hardware platform (e.g., a corresponding one of virtual hardware platforms 214-1 to 214-N). Each such virtual hardware platform 214 provides emulated hardware (e.g., memory 202A, processor 204A, local storage 206A, networked storage 208A, network interface 210A, etc.) that may, for example, function as an equivalent, conventional hardware architecture for its corresponding VM 112. Virtual hardware platforms 214-1 to 214-N may be considered part of virtual machine monitors (VMMs) 212-1 to 212-N which implement virtual system support to coordinate operations between hypervisor 116 and corresponding VMs 112-1 to 112-N. In the embodiment depicted in FIG. 2, each VM 112 includes a guest operating system (OS) 216 (e.g., Microsoft Windows, Linux) and one or more guest applications running on top of guest OS 216. In one embodiment, each VM 112 includes a runtime environment 218, such as a Java Virtual Machine (JVM), that supports execution of a distributed software component code 220 (e.g., Java code) for distributed computing application 124. For example, if distributed computing application 124 is a Hadoop application, a VM 112 may have a runtime environment 218 (e.g., JVM) that executes distributed software component code 220 implementing a workload scheduler function (sometimes referred to as "Job Tracker"), "Task Tracker" function, or "Name Node" function, "Data Node" function, described further below. In another example of a distributed computing application 124, a VM 112 may have a runtime environment 218 (e.g., JVM) that executes distributed software component code 220 implementing a "Resource Manager" function, "Application Master" function, "Node Manager" function, and "Container" function. In another example of a distributed computing application, a VM 112 may have a runtime environment 218 that executes distributed software component code 220 implementing an "HBase Master" function and a "Region Server" function, also described further below. Alternatively, each VM 112 may include distributed software component code 220 for distributed computing application 124 configured to run natively on top of guest OS 216.

Referring back to FIG. 1, computing system 100 includes a virtualization management module 104 that may communicate to the plurality of hosts 108 via network 110. In one embodiment, virtualization management module 104 is a computer program that resides and executes in a central server, which may reside in computing system 100, or alternatively, running as a VM in one of hosts 108. One example of a virtualization management module is the VCenter® Server product made available from VMware, Inc. Virtualization management module 104 is configured to carry out administrative tasks for the computing system 100, including managing hosts 108, managing VMs running within each host 108, provisioning VMs, migrating VMs from one host to another host, load balancing between hosts 108, creating resource pools 114 comprised of computing resources of hosts 108 and VMs 112, modifying resource pools 114 to allocate and de-allocate VMs and physical resources, and modifying configurations of resource pools 114. In one embodiment, virtualization management module 104 may issue commands to power on, power off, reset, clone, deploy, and provision one or more VMs 112 executing on a particular host 108. In one embodiment, virtualization management module 104 is configured to communicate with hosts 108 to collect performance data and generate performance metrics (e.g., counters, statistics) related to availability, status, and performance of hosts 108, VMs 112, and resource pools 114.

In one embodiment, distributed computing application 124 may be an implementation of the MapReduce model, which is a distributed processing framework for large-scale data processing. MapReduce computations, referred to as jobs or applications, are broken into tasks that run in two phases—Map and Reduce. During the Map Phase, (Map) tasks read data from a distributed file system (in parallel) and perform their computations in parallel. At the end of the Map phase, the intermediate output (results of the computations) generated locally are sent to the Reduce phase (potentially remote) for aggregation or further processing, before the final results are written to the distributed file system. Hadoop is an open-source implementation of the MapReduce model, and may rely on a Hadoop Distributed File System (HDFS) for data storage.

In one embodiment, distributed computing application 124 includes an application workload scheduler 126 (e.g., executing in a VM) which accepts jobs from clients 102 and schedules corresponding workloads for execution on a plurality of compute nodes 128 that are associated with distributed computing application 124. In some implementations of Hadoop, application workload scheduler 126 may be referred to as a "JobTracker," or in other implementations, may have functionality split between a "Resource Manager" and an "Application Master." Each compute node 128, which may be executing as a VM 112, is a worker node that carries out tasks (e.g., map tasks, reduce tasks of a MapReduce job) provided by application workload scheduler 126. Each compute node 128 may handle multiple tasks in parallel. In one embodiment, a compute node 128 is configured to run one or more tasks in one or more available "slots" or "containers." In one example, each slot may be implemented as an instance of a runtime environment (e.g., Java Virtual Machine) executing distributed software component code (e.g., code 220) for completing a single task. As such, in some embodiments, each compute node 128 may execute multiple instances of the runtime environment to execute in parallel multiple tasks assigned to the compute node by the workload scheduler 126. In some implementations of Hadoop, compute nodes 128 may be referred to as "TaskTracker" nodes or "Node Managers." If a compute node 128 fails due to software error, network problems, or other issues, application workload scheduler 126 is able to adjust its scheduling of the application workload accordingly. For example, application workload scheduler 126 may mark failed compute VMs as "unavailable" for accepting tasks, and modify placement of subsequent tasks to other slots in same nodes or other nodes based on the reduced amount of available resources.

While the embodiment shown in FIG. 1 depicts one example architecture of a Hadoop application configured to process a large set of data using a distributed set of nodes, it should be recognized that alternative architectures, such as YARN (Yet Another Resource Negotiator) and other MapReduce-related architectures, may be utilized with the techniques described herein. It should be further recognized that, while embodiments of present disclosure are described in terms of a Hadoop installation, other distributed computing applications may be configured and utilized according to the techniques provided herein.

According to one embodiment, computing system 100 may have another distributed application, referred to herein as a distributed database application 140, executing across the plurality of hosts 108 alongside distributed computing application 124. Distributed database application 140 may be a non-relational, distributed, column-oriented database or data store configured to manage large-scale structured datasets, similar to Google's BigTable. One example of distributed database application 140 is HBase, which is an open source implementation made available by the Apache Software Foundation, and, similar to Hadoop MapReduce, may also rely upon a distributed filesystem (i.e., HDFS) for underlying storage of data tables. Data tables in HBase (i.e., "HTables") are both horizontally and vertically partitioned into data blocks referred to as regions. The regions of a table are evenly distributed among multiple nodes, referred to as region servers. In operation, queries may be issued to HBase region servers to perform low-latency read and write operations on the tables of data. In some cases, tables in HBase can serve as an input and output for MapReduce jobs run in a distributed computing application, such as Hadoop. Depending upon the various workloads of the region servers, regions may be re-distributed among nodes to balance performance and load. Additionally, when regions grow too large after adding additional rows, regions may be dynamically sub-divided into smaller regions (i.e., auto-sharding) and re-distributed. To further improve the performance of read operations on tables that receive frequent read operations, some tables are turned into in-memory tables so that they may be cached more aggressively.

In one embodiment, distributed database application 140 includes a master node 142 and a plurality of region servers 144. Each region server 144 (e.g., executing in a VM 112) is configured to serve a set of regions, or a range of rows of a table. Region servers 144 may be configured to serve read and write requests from clients of distributed database application 140, including distributed computing application 124 in cases where input and output for MapReduce jobs are stored in distributed database application 140. In one embodiment, master node 142 (e.g., executing in a VM 112) is configured to coordinate regions in the cluster and execute one or more administrative operations for distributed database application 140. For example, each region may be assigned to a region server 144 on startup, and master node 142 may move a region from one region server to another as the result of a load balance operation. In another example, master node 142 may handle region server failures by assigning the region from a failed region server to another region server.

In some embodiments, distributed computing application 124 and distributed database application 140 may be configured to support a differentiated services architecture (i.e., DiffServ) that provides QoS for network and I/O traffic transmitted during operations of the distributed computing application 124 and distributed database application 140. As such, embodiments described herein may prioritize traffic and resources of one application over the other while executing concurrently in the same computing environment, such as computing system 100. For example, computing system 100 may be configured to provide QoS guarantees for distributed database application 140 when processing, for example, low-latency queries on HTable in real-time, even though a MapReduce job for distributed computing application 124 may also be in progress.

As described earlier, both distributed computing application 124 and distributed database application 140 may use a distributed filesystem 130, such as HDFS, configured to store and access data files in a distributed manner across nodes, referred to herein as data nodes 136. A file stored in distributed filesystem 130 is split into one or more data blocks, and the data blocks are stored in a set of data nodes 136. Each data node 136 may use and manage a data store in local storage 206 of the host on which each data node 136 is executing or in networked storage 230 accessible to the host on which each data node 136 is executing to store data blocks used by distributed computing application 124. In one embodiment, distributed filesystem 130 includes a name node 132 configured to track where data is located within storage resources of hosts 108 (e.g., local storage 206 and networked storage 230) and determine mappings of data blocks to data nodes 136. Data nodes 136 may be configured to serve read and write requests from clients of distributed filesystem 130, including distributed computing applications 124 and distributed database application 140. Data nodes 136 may be further configured to perform block creation, deletion, and replication, upon instruction from name node 308.

In one or more embodiments, computing system 100 includes a virtual Hadoop manager 106 (VHM) configured to enable elastic multi-tenant distributed computing and distributed database applications on a virtualized environment, such as computing system 100. Virtual Hadoop manager 106 is configured to communicate (e.g., via an API call) with virtualization management module 104 to add and remove VMs of compute clusters and database clusters based on performance metrics associated with computing resources of system 100 and on performance metrics associated with the compute clusters. In some embodiments, VHM 106 may expand a cluster (e.g., add node) when VHM 106 determines there is work to be performed with no contention for resources within virtualized computing system 100. In some embodiments, VHM 106 shrinks a cluster (e.g., removes node) when VHM 106 determines there is contention for resources within virtualized computing system 100.

Multi-Tenancy for Hadoop and Hbase Frameworks

In some cases, users may wish to run jobs in a distributed computing application 124, such as Hadoop, concurrently with executing an instance of a distributed database application 140, such as HBase, in computing system 100. In a typical case, jobs for distributed computing application 124 may be batch processing of large data sets that take several minutes or hours to complete, while workloads for distributed database application 140 may require low-latency processing of large data sets to occur in real-time. As such, there is a desire to balance allocated computing resources within the virtualized environment while guaranteeing a certain quality of service (QoS) for each respective distributed application.

Conventional techniques for deploying distributed computing applications and distributed database applications on the same system use worker nodes that combine a compute node (e.g., TaskTracker), a region server (e.g., for HBase), and a data node (e.g., for HDFS) into each worker node, i.e., typically each physical host. However, these conventional Hadoop deployments have been unable to provide quality of service (QoS) guarantees across tenants due to lack of enforcement of resource constraints and tradeoffs between over-commitment of resources and low resource utilization.

Accordingly, embodiments described herein provide multiple clusters deployed for distributed computing application 124 and distributed database application 140, but share just one underlying common storage substrate (e.g., HDFS). An example of a shared storage layer for distributed computing and distributed databases is described in conjunction with FIG. 3. In other embodiments, separate distributed filesystems for distributed computing application 124 and distributed database application 140 may be used, as described later in conjunction with FIG. 5.

Figure 3:
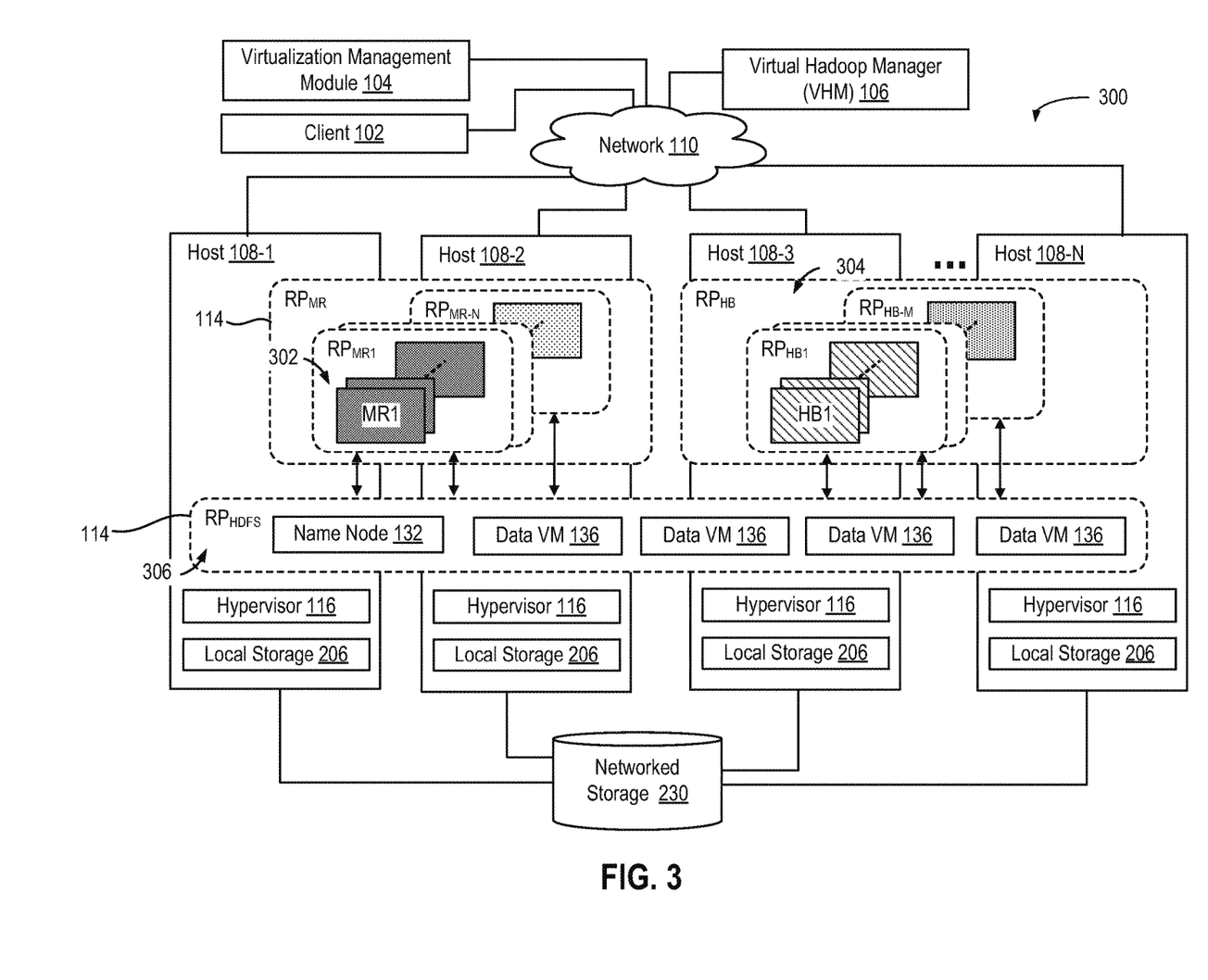
FIG. 3 is a block diagram that depicts a distributed computing application and a distributed database application from different tenants sharing a distributed storage layer, according to an embodiment of the present disclosure.

FIG. 3 is a block diagram that depicts a computing system 300 executing a distributed computing application and distributed database application that share a distributed storage layer, according to an embodiment of the present disclosure. In the embodiment shown, computing system 300 includes one or more compute clusters 302, one or more database clusters 304, and a shared distributed filesystem 306 (e.g., HDFS) distributed across a plurality of hosts 108 of computing system 300. Each compute cluster 302 may be configured similarly to distributed computing application 124 shown in FIG. 1, for example, having an application workload scheduler 126 and a plurality of compute VMs, although other types of compute clusters may be used. Each database cluster 304 may configured similarly to distributed database application 140 shown in FIG. 1, for example, having a master node 142 and a plurality of region servers 144. Similarly, distributed filesystem 306 may be configured similarly to distributed filesystem 130 shown in FIG. 1, for example, having a name node 132 and data nodes 136.

Each compute cluster 302 and database cluster 304 may be associated with a particular tenant, i.e., dedicated to executing jobs, such as MapReduce jobs, or processing queries received from that particular tenant. In the embodiment shown, compute clusters 302 and database clusters 304 may be organized into different resource pools 114 for resource management and isolation purposes (i.e., changes within one resource pool do not impact other unrelated resource pools). For example, VMs of a first compute cluster 302 (identified with "MR1") are organized into a first resource pool (identified as $RP_{MR1}$), and so forth, with VMs of a particular compute cluster 302 are organized into a corresponding resource pool (i.e., $RP_{MR-N}$), which are child resource pools of a resource pool $RP_{MR}$ associated with distributed computing application 124. Similarly, VMs of a first database cluster 304 (identified with "HB1") are organized into a resource pool (identified as $RP_{HB1}$), and so forth, with VMs of a particular database cluster are organized into corresponding resource pools $RP_{HB-M}$. In one embodiment, VMs of distributed filesystem 306, including a name node 132 and data nodes 136, are organized into their own resource pool $RP_{HDFS}$ separate from resource pools of the compute clusters and database clusters. In other embodiments, VMs of distributed filesystem 306 may be part of the resource pool for database clusters 304.

In one or more embodiments, resource controls of resource pools 114 associated with different compute clusters 302 and different database clusters 304 may be configured to provide differentiated quality of service (QoS) between tenants (i.e., Hadoop, HBase frameworks). In some embodiments, resource controls such as "reservations," "limits", and "shares" settings may be set for each resource pool (e.g., $RP_{MR1}$. $RP_{MR}$, $RP_{HB1}$, $RP_{HB}$, $RP_{HDFS}$) to manage allocation of computing resources (e.g., memory, CPU) of computing system 300. It should be recognized that because data VMs provide a common storage space shared across tenants, embodiments described herein avoid partitioning effects that arise with conventional techniques using separate independent Hadoop deployments.

Figure 4A:
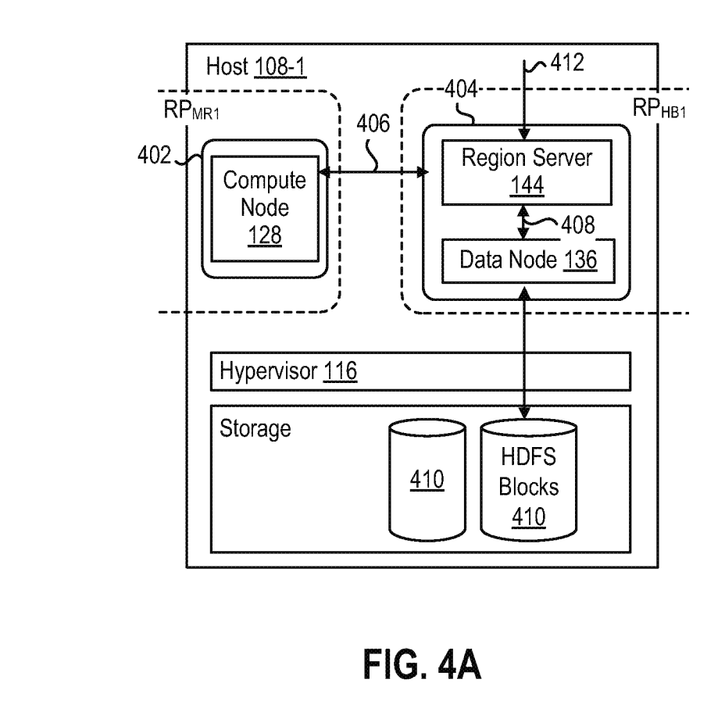
FIGS. 4A and 4B are block diagrams depicting embodiments of a node supporting a distributed computing application and a distributed database application.

FIG. 4A is a block diagram depicting one embodiment of a node supporting distributed computing application 124 and distributed database application 140. In the embodiment shown, each host 108 (e.g., 108-1) may include a separate compute node 128 (e.g., TaskTracker, NodeManager) executing in a first VM 402 and a data node 136 and region server 144 executing in a second VM 404. In the embodiment shown in FIG. 4A, compute VM 402 may be part of a resource pool $RP_{MR1}$ separate from a resource pool $RP_{HB1}$ having VM 404. As such, computing resources (e.g., CPU, memory) for compute VMs 402 may be isolated from computing resources used for storage VMs 404 (i.e., region server 144 and data node 136).

In contrast to traditional implementations of Hadoop where each node may be a combined data-compute-region server node, this separation of compute nodes and storage (i.e., data node and region server) into separate VMs enables embodiments described herein to elastically scale Hadoop clusters as compute VMs 128 may be powered on and off without affecting storage services, e.g., HDFS and HBase. Accordingly, embodiments described herein advantageously provide efficient multi-tenancy and improved resource utilization. Further, while physical deployments of Hadoop can be modified to separate storage (i.e., data and region server) and compute nodes, it has been determined that this may result in some machines being fully dedicated for compute and others fully dedicated for storage, which in turn leads to under-utilization of resources. Although some operation system-level virtualization techniques, such as Linux containers, can address some of these issues, it has been determined that operation system-level virtualization cannot guarantee the performance and security isolation that VMs provide to effectively support multi-tenancy. Accordingly, in embodiments of distributed computing application 124 running on a virtualized environment such as computing system 100, compute VMs 128 and data node and region server VMs can be deployed on a same host 108, providing the ability to share the underlying hardware resources while allowing true multi-tenancy and elasticity.

In the embodiment shown in FIG. 4A, compute VM 402 communicates with VM 404 to access both distributed database application 140 and distributed filesystem 130, as depicted by 406. For example, compute VM 402 may issue (e.g., via remote procedure calls, or RPC calls) read and write requests to data node 136 for data blocks 410 stored on that host, e.g., for executing MapReduce tasks on those data blocks. Compute VM 402 may also communicate with VM 404 to query region server 144 to execute MapReduce tasks on data stored within regions of distributed database application 140 assigned to that region server 144, which, in turn, accesses data node 136 for data blocks corresponding to rows of the region (depicted as 408). It should be recognized that region server 144 executing on VM 404 may also receive query commands from other clients of distributed database application 140, for example, to perform low-latency HBase queries on HTable, as depicted by 412. The embodiment shown in FIG. 4A improves performance for distributed database application 140 (e.g., HBase) because placing region server 144 and data node 136 within the same VM 404 enables local read optimizations to be used. For example, rather than using RPC calls to read local replicas stored in the data node, region server 144 may use faster techniques for reading data blocks 410 from data node executing on the same VM, such as shared memory, domain-socket file descriptor passing, etc.

Figure 4B:
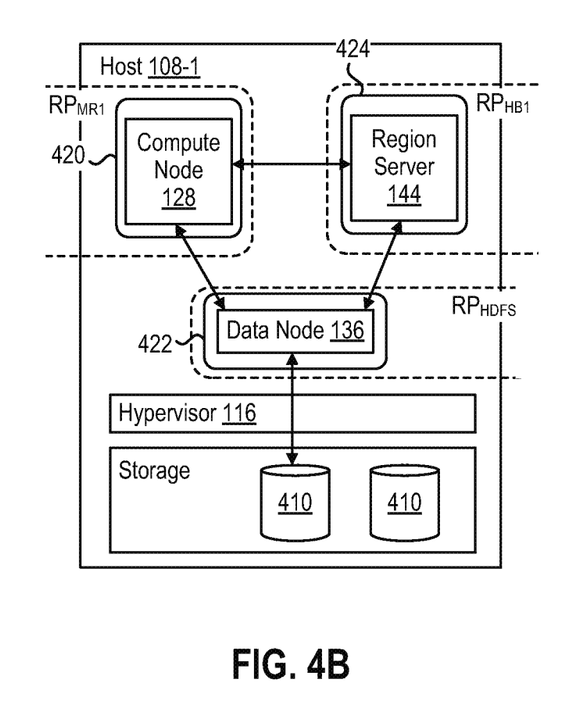

FIG. 4B is a block diagram depicting another embodiment of a node supporting distributed computing 124 and distributed database application 140. In the embodiment shown, each host 108 may include a separate VM for compute nodes 128, data nodes 136, and region servers 144. For example, host 108-1 may include a compute VM 420 executing compute node 128, a data VM 422 executing data node 136, and a region server VM 424 executing region server 144. In the embodiment shown in FIG. 4B, compute VM 420 may be part of a resource pool $RP_{MR1}$ which is separate from resource pool $RP_{HDFS}$ having data VM 422 and resource pool $RP_{HB1}$ having region server VM 424. As such, computing resources (e.g., CPU, memory) for compute VMs 420 and region server VMs 424 may be isolated from computing resources used for data VMs 422.

The embodiment shown in FIG. 4B supports elastic multi-tenant distributed compute application and distributed database against a shared separate distributed filesystem 130. For example, in response to increased work for distributed database application 140, VHM 106 may instantiate additional region servers VMs 424 within hosts 108. In another example, VHM 106 may instantiate additional compute VMs 420 to increase the capacity of distributed computing application 124 to perform MapReduce jobs. Further, VHM 106 may shut down compute VMs 420 and region server VMs 424 (which typically consume large amounts of memory) to relinquish resources when resources are needed for other workloads, without having to shut down a corresponding data node 136 and disturb the distributed storage layer.

Figure 5:
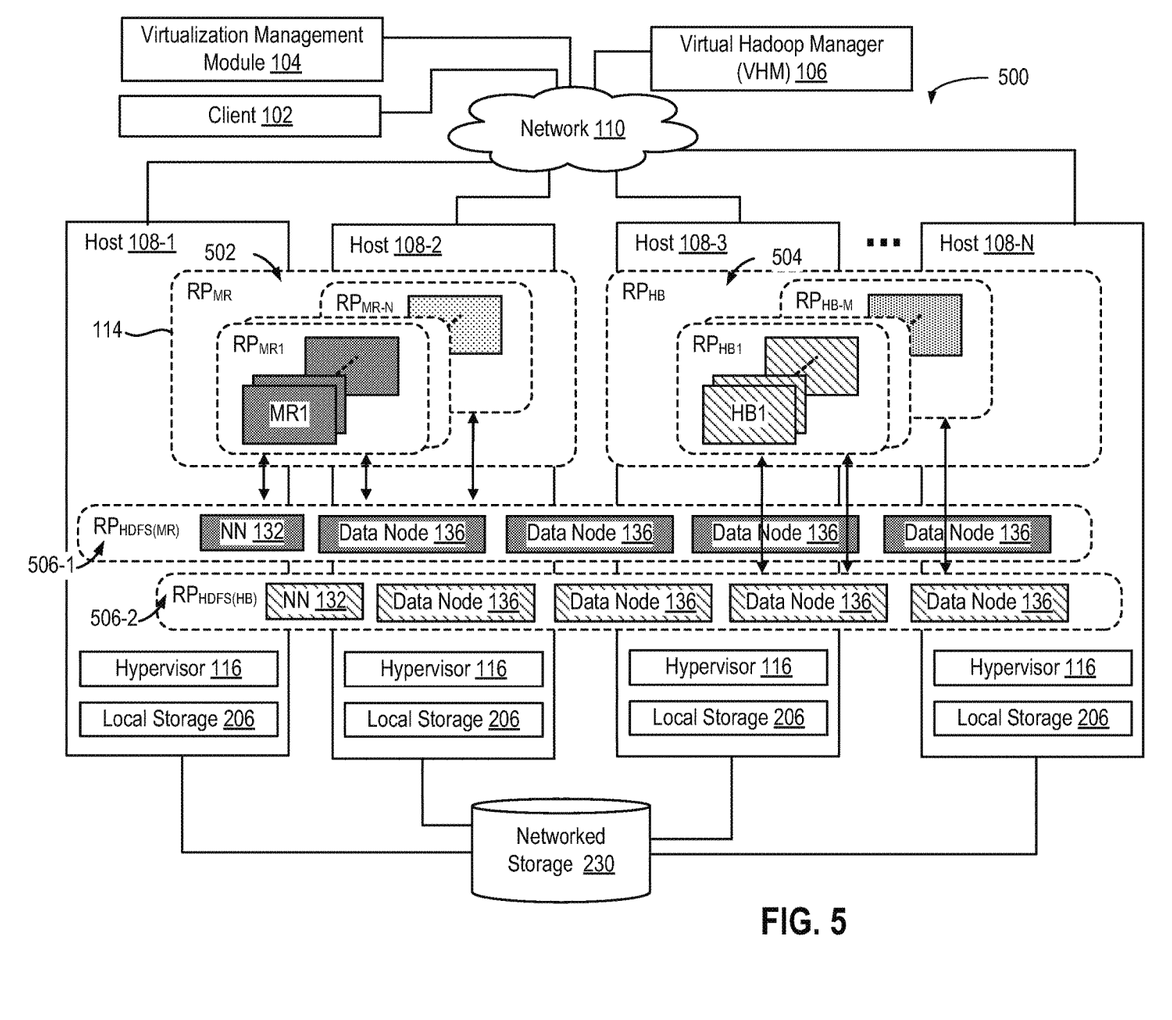
FIG. 5 is a block diagram that depicts a distributed computing application having separate compute clusters from different tenants using separate distributed storage clusters, according to an embodiment of the present disclosure.

FIG. 5 is a block diagram that depicts a computing system 500 executing a distributed computing application and distributed database application from different tenants using separate distributed filesystems, according to an embodiment of the present disclosure. In the embodiment shown, computing system 500 includes a plurality of compute clusters 502 and a plurality of database clusters 504 a distributed across a plurality of hosts 108 of computing system 500. Similar to the embodiment shown in FIG. 3, the plurality of compute clusters 502 may be organized into resource pools $RP_{MR1-N}$, $RP_{MR}$, $RP_{HB1-M}$, and $RP_{HB}$, as shown in FIG. 5.

In contrast to computing system 300, computing system 500 includes a plurality of distributed filesystems 506 (e.g., 506-1, 506-2) associated with a particular compute cluster 502 or database cluster 504. The multiple instances of distributed filesystem 506 may include separate instances of name nodes 132 and data nodes 136. Compute VMs of a particular compute cluster 502 are configured to access data VMs of the corresponding distributed filesystem 506 associated with the tenant. For example, compute VMs of compute cluster 502 read and write data blocks to data nodes 136 of the corresponding distributed filesystem 506 associated with distributed computing application 124. Similarly, region server VMs of a database cluster 504 may read and write data to data VMs 136 of distributed filesystem 506-2 associated with distributed database application 140.

In some embodiments, VMs of a distributed filesystem 506-1 associated with distributed computing application 124 may be organized into their own resource pool $RP_{HDFS(MR)}$; and VMs of distributed filesystem 506-2 associated with distributed database application 140 may be organized into a separate resource pool $RP_{HDFS(HB)}$. Accordingly, embodiments described herein may guarantee QoS across tenants because computing resources, such as memory and CPU, may be isolated not just with compute VMs, but also with region server VMs associated with different tenants. Unlike in previous approaches, data traffic associated with different tenants is in fact going to separate VMs, which may be differentiated, isolated, and managed accordingly. In some embodiments, resource controls of resource pools 114 associated with different distributed filesystems 506 may be configured to provide differentiated quality of service (QoS) between tenants (i.e., Hadoop, HBase frameworks). For example, hypervisor 116 on a host may prioritize traffic from region server VMs 424 of distributed database application 140 over traffic from compute VMs 420 through a virtual switch layer of hypervisor 116, according to techniques for network I/O control (NIOC).

Figure 6A:
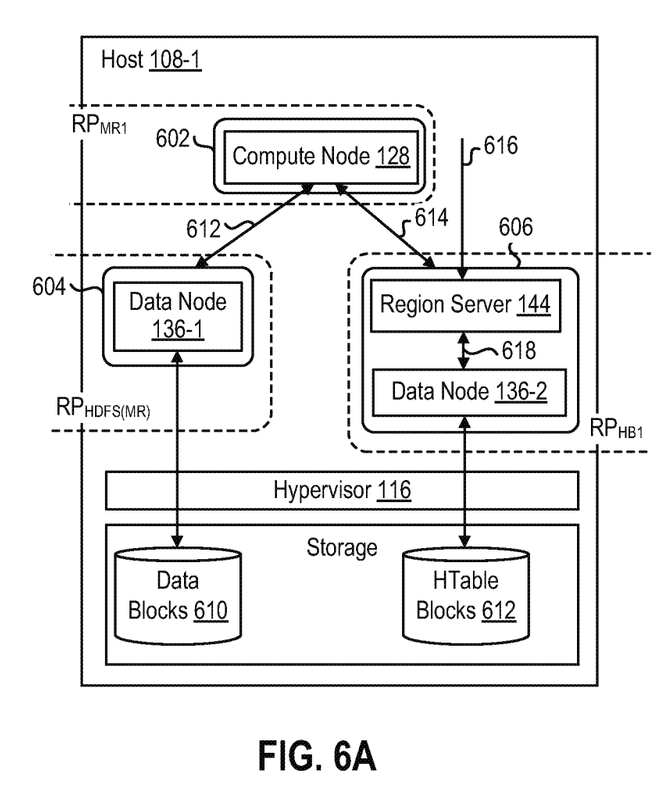
FIGS. 6A and 6B are block diagrams depicting embodiments of a node supporting a distributed computing application and a distributed database application with separate storage layers.

FIG. 6A is a block diagram depicting one embodiment of a node supporting distributed computing application 124 and distributed database application 140 with separate storage layers. As described above, in one embodiment, compute clusters 502 may have a dedicated distributed filesystem (e.g., HDFS layer), and database clusters 504 may also have their own dedicated distributed filesystem. In the embodiment shown in FIG. 5A, each host may include at least one VM 602 executing as a compute node 128, at least one VM 604 executing as a data node 136-1 associated with compute node 128. Compute VM 602 issues (e.g., via RPC call) data access requests to data VM 604 for data blocks stored on that host, e.g., input data blocks needed to execute Map tasks or output data blocks resultant from executing Reduce tasks, as depicted at 612.

Each host also includes at least one VM 606 having region server 144 and the associated data node 136-2 co-located in the same VM 606. VM 606 may receive database requests (e.g., HTable commands) from compute VM 602 for processing distributed computing jobs (e.g., MapReduce jobs) on regions stored within distributed database application 140, as shown at 614, or from other clients of distributed database application 140 for serving database queries on the region associated with region server 144, as shown at 616. As shown, region server 144 is configured to access data node 136-2 co-located on the same VM 606 to service database requests on the region associated with region server 144 and stored in underlying storage as blocks 612 of data for the region, e.g., rows of HTable. Similar in some aspects to the embodiment shown in FIG. 4A, region server 144 may access the associated data node 136-2 using local read optimization techniques, such as shared memory access, domain-socket file descriptor passing, etc., for improved read performance when compared to traditional techniques, e.g., RPC calls.

As shown in FIG. 6A, in some embodiments, VM 602 may be part of a resource pool (e.g., $RP_{MR1}$) associated with distributed computing application 124, which may include compute VMs executing on other hosts. VM 606 may be part of another resource pool (e.g., $RP_{HB1}$) associated with distributed database application 140, which also may include similarly configured VMs having region server 144 and an associated data node executing on other hosts. Embodiments described herein may be configured such that computing resources across the plurality of hosts 108 (e.g., CPU, memory, I/O) allocated for VMs 602 may be isolated from computing resources used for VMs 606. QoS support may be provided between pure compute workloads executing on VMs 602 and database workloads executing on VMs 606. Further, it should be recognized that in this embodiment, VMs 602 having compute nodes 128 may be scaled elastically by adding or removing such VMs 602 to increase or decrease processing capacity of distributed computing application 124 without affecting the storage layers of VM 604 and VM 606.

Figure 6B:
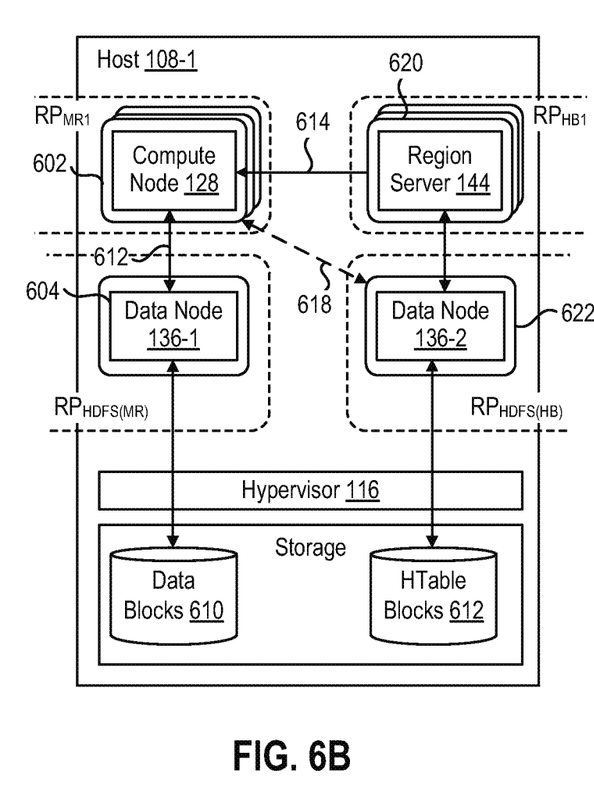

FIG. 6B is a block diagram depicting another embodiment of a node supporting distributed computing 124 and distributed database application 140 with separate storage layers. In one embodiment, compute clusters may have a dedicated distributed filesystem (e.g., HDFS layer), and database clusters may also have their own dedicated distributed filesystem, similar to the embodiment shown in FIG. 6A, except that region servers 144 itself may be isolated from the corresponding storage layer. In one embodiment, each host 108 (e.g., 108-1) may include at least one VM 620 having region server 144 and a separate VM 622 having the associated data node 136-2. As in FIG. 6A, VM 620 having region server 144 may receive database requests from compute VMs 602 for processing distributed computing jobs on distributed database regions stored within data node 136-2, or from other clients of distributed database application 140. VM 620 having region server 144 accesses VM 622 having the associated data node 136-2 to service database requests on regions associated with region server 144 and stored in underlying storage (e.g., HTable blocks 612) at that node. In some embodiments, compute VM 602 may communicate with data node VM 604, as well as data node VM 622 (as depicted by 618), to gather log data, obtain performance metric data for each data node, and coordinate other HDFS activities.

In one embodiment, for distributed computing application 124, the main sources of I/O for compute VM 602 include: HDFS data and network I/O between a compute VM 602 and an associated data VM 604, as depicted as 612; disk I/O between a compute VM 602 and underlying local storage 206 of host 108 that includes writing intermediate outputs to disk and storage I/O (as well as network I/O if the intermediate outputs are written to a networked storage 230.) In some embodiments, sources of I/O for a data VM 604 associated with the compute VM include disk I/O when writing HDFS data to disk and storage I/O (as well as network I/O if the intermediate outputs are read from a mounted networked storage 230). In some embodiments, sources of I/O for compute VMs may also include communication between compute VMs that includes transmitting data for Reduce tasks and network I/O. In some embodiments, sources of I/O for data VMs 604 may include HDFS data load balancing and network I/O.

In one embodiment, for distributed database application 140, the main sources of I/O for region server VMs when performing operations on HTables for Non-MapReduce-related operations includes: network I/O between a region server VM 620 and an associated data VM 622 in cases where the region server and data node are in different VMs (as in FIG. 6B). I/O between a region server VM 620 and an associated data VM 622 may also include write ahead log (WAL) data including sequential writes which are generally small, low latency requests (i.e., in a critical path). I/O between a region server VM 620 and an associated data VM 622 includes read requests that are characterized as random, which may be latency sensitive (if not a hit in the region server's cache), and write requests that are characterized as sequential, which may be large and throughput-sensitive, for example, when writing to HFile from a MemStore. I/O between a region server VM 620 and an associated data VM 622 may include minor and major compactions in which HFiles are read from a data VM 622, sorted, updated, and written back to data VM 622. I/O between a region server VM 620 and an associated data VM 622 may also include region splits which cause a parent HFile to be split into two children and involve data read into region server VM 620 and written back to data VM 622. In some embodiments, I/O between a region server VM 620 and an associated data VM 622, as well as between sibling region server VMs 620, may include operations of the balancer, which involves regions moved between region servers (i.e., reading from a source data VM to a region server VM and written from a destination region server VM to the associated data VM). In some embodiments, I/O from a data VM 622 associated with a region server to disk may include storage I/O, which generally includes random, latency-sensitive read operations, and sequential throughput-sensitive write operations.

In one embodiment, for distributed database application 140, the main sources of I/O for region server VMs when performing operations on HTables for MapReduce operations includes: I/O between a region server VM 620 and an associated data VM 622 that includes HTable data and corresponding network I/O. In some embodiments, I/O between a compute VM 602 and an associated data VM includes HFile data and corresponding network I/O; read operations to the data VM which may be large sequential reads that are throughput-sensitive (i.e., in critical path); and write operations to the data VM, which may be large sequential writes that are also throughput-sensitive (i.e., not in critical path).

In the embodiment shown in FIG. 6B, compute VMs 602, data node VMs 604 associated with the compute cluster, and data node VMs 622 associated with the database cluster are organized into separate resource pools $RP_{MR1}$, $RP_{HDFS(MR)}$, and $RP_{HDFS(HB)}$, respectively. In one or more embodiments, region server VM 620 may be part of a separate resource pool $RP_{HB1}$ associated with distributed database application 140, and may be isolated from VMs 602, 604, 622 for compute clusters and the distributed storage layers. In some embodiments, region server VMs 620 may be configured to serve queries using in-memory tables, and performance of such region server VMs 620 may be based, at least in part, on memory resources. As such, region server VMs 620 in resource pool $RP_{HB1}$ may be isolated from other resource pools and associated VMs and given a high priority of computing resources (e.g., memory) to ensure a high level of performance. Further, because region server VMs 620 are independent of their associated data node VMs 622, nodes of distributed database application 140 may be elastically scaled to add or remove additional region server VMs 620 based on resource contention, workload, and other factors, without affecting VM 622 and the storage layer associated with distributed database application 140.

While the embodiment shown in FIG. 6B has discussed as having a single compute VM for each data node VM, and a single region server VM for each data node VM, it should be recognized that in other embodiments, each host may have multiple compute VMs and region server VMs for each data node VM (i.e., N-to-1 mapping). In one alternative embodiment, each compute node 128 may be configured to have fewer slots for performing tasks compared to typical compute nodes, and each region server 144 may be configured to serve a smaller region of table data compared to typical region servers (e.g., 4 GB region compared to a 16 GB region). In such an embodiment, multiple compute VMs with fewer slots may be mapped to a single data node VM, thereby providing a finer-grained elasticity for compute clusters because computing resources are relinquished or consumed in finer increments which compute VMs are added or decommissioned. Similarly, multiple region server VMs with smaller regions may be mapped to a single associated data node VM, and resources may be relinquished or consumed in increments of 4 GBs rather than 16 GBs when scaling the distributed database cluster.

Figure 7:
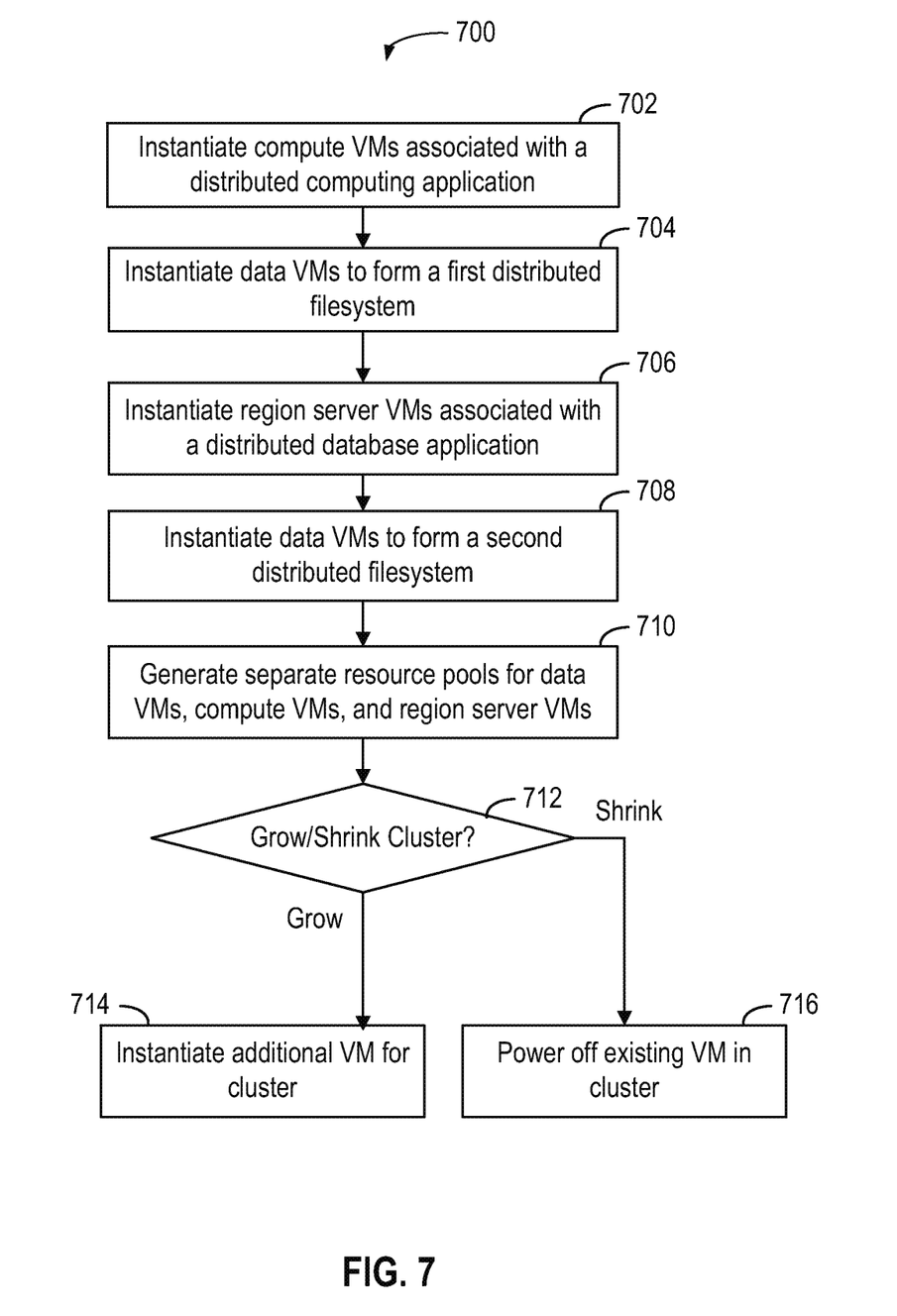
FIG. 7 is a flow diagram that illustrates steps for a method of providing distributed storage for a distributed computing application and distributed database application executing within a virtualized environment, according to an embodiment of the present disclosure

FIG. 7 is a flow diagram that illustrates steps for a method 700 of providing distributed storage for a distributed computing application and distributed database application executing within a virtualized environment, according to an embodiment of the present disclosure. It should be recognized that, even though the method is described in conjunction with the system of FIG. 1, any system configured to perform the method steps is within the scope of embodiments of the disclosure.

At step 702, a plurality of compute VMs is instantiated on a plurality of hosts. Each compute VM may be associated with a distributed computing application (e.g., Hadoop) and is configured to process a portion of an input data set for a job. In some embodiments, the plurality of compute VMs may be part of a first resource pool associated with the distributed computing application. At step 704, a plurality of data VMs is instantiated on the hosts to form a first distributed filesystem, which is accessible by a plurality of compute VMs. In some embodiments, the first distributed filesystem may store the input data for a received job.

At step 706, a plurality of region server VMs associated with a distributed database application is instantiated on the hosts. At step 708, a second plurality of data VMs are instantiated on the hosts to form a second distributed filesystem, which is accessible by the plurality of region server VMs. Each region server VM may be configured to serve a portion of a data table stored in the second distributed filesystem. In some embodiments, the region server VMs and the second plurality of data VMs may be combined such that each VM includes a region server node and a data node, where data node is configured to store a portion of the data table associated with the region server node. In some embodiments, a region server VM may be a member of a resource pool associated with the distributed database application, and a data VM may be a member of a resource pool associated with the second distributed filesystem.

At step 710, separate resource pools may be generated for the data VMs, compute VMs, and the region server VMs. In some embodiments, the compute VMs are organized in a first resource pool associated with the distributed computing application, the region server VMs are organized into a second resource pool associated with the distributed database application, and the second resource pool is configured to have a higher priority for computing resources than the first resource pool. In some embodiments, resource controls (e.g., reservation, limit, shares settings) may be configured for each resource pool to isolate and allocate computing resources of the hosts between the VMs based on the different performance requirements of the distributed computing application and the distributed database application. Accordingly, embodiments of the present disclosure enable a query (e.g., HBase query) to be executed on at least one of the plurality of region server VMs, while concurrently executing a MapReduce job on the plurality of compute VMs in a manner that balances performance and resource needs of both application.

At step 712, virtual Hadoop manager 106 may receive an indication to expand or grow a particular cluster of the distributed computing application or the distributed database application. In some embodiments, responsive to an indication to expand the distributed database application, virtual Hadoop manager 106 instantiates (e.g., via API call to virtualization management module 104) an additional VM comprising another region server node configured to store a portion of the data table associated with that new region server node within the additional VM. Responsive to an indication to shrink the distributed database application, virtual Hadoop manager 106 may issue a command (e.g., via API call to virtualization management module 104) to power off one of the region server VMs (e.g., comprising the first region server node.)

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for executing a distributed computing application within a virtualized computing environment, the method comprising:
    instantiating a first plurality of virtual machines (VMs) on a plurality of hosts as data nodes of a first distributed file system,
        wherein the data nodes of the first distributed file system are concurrently accessible by a plurality of compute VMs including a first compute VM and a second compute VM,
        wherein each compute VM is configured to request and obtain data blocks from one or more of the data nodes of the first distributed file system, the data blocks containing a portion of an input data set, and process the portion of the input data set stored in the first distributed file system,
        wherein the first compute VM and the second compute VM are configured to concurrently process respectively a first portion of the input data set and a second portion of the input data set, and
        wherein data nodes and compute VMs are separate VMs; and
    instantiating a second plurality of VMs on the plurality of hosts as data nodes of a second distributed file system,
        wherein data nodes of the second distributed file system are concurrently accessible by a plurality of region server nodes associated with a distributed database application, the plurality of region server nodes including a first region server node and a second region server node,
        wherein each region server node is a virtual machine configured to request from and obtain data blocks from one or more of the data nodes of the second distributed file system, the data blocks containing a portion of a data table and to perform database operations on the portion of a data table stored in the second distributed file system,
        wherein the first region server node and the second region server node are configured to concurrently process respectively a first portion of the data table and a second portion of the data table, and
        wherein the data nodes and the region server nodes are separate VMs;
    wherein each compute VM is coupled to at least one of the plurality of region server nodes for access to a portion of the data table which the at least one of the plurality of region server nodes is configured to serve; and
    wherein the access provided by the coupling allows each compute VM to request from and obtain data blocks from one or more of the data nodes of the second distributed file system, the data blocks containing a portion of the data table, and to process as part of the distributed computing application the portion of the data table which the at least one of the plurality of region server nodes is configured to process.

2. The method of claim 1, wherein instantiating the second plurality of VMs on the plurality of hosts to form the second distributed file system comprises:
    instantiating a first VM comprising the first region server node and a first data node executing on the same VM, wherein the first data node is configured to store a portion of the data table associated with the first region server node.

3. The method of claim 2, wherein the plurality of compute VMs comprises a first resource pool associated with the distributed computing application, and the second plurality of VMs comprises a second resource pool associated with the distributed database application, wherein the second resource pool has a higher priority for computing resources than the first resource pool.

4. The method of claim 1,
    wherein instantiating the second plurality of VMs on the plurality of hosts to form the second distributed file system comprises:
    instantiating a first VM comprising the first region server node; and
    instantiating a second VM comprising a first data node configured to store a portion of the data table associated with the first region server node, wherein the first VM and the second VM are executing on the same host.

5. The method of claim 4,
wherein the plurality of compute VMs comprises a first resource pool associated with the distributed computing application,
wherein the first VM is a member of a second resource pool associated with the distributed database application,
wherein the second VM is a member of a third resource pool associated with the second distributed file system.

6. The method of claim 4, further comprising:
responsive to an indication to expand the distributed database application, instantiating a third VM comprising the second region server node configured to store a portion of the data table associated with the second region server node within the second VM; and
responsive to an indication to shrink the distributed database application, powering off the first VM comprising the first region server node.

7. The method of claim 1, further comprising:
executing an HBase query on at least one of the plurality of region server nodes while concurrently executing a MapReduce job on the plurality of compute VMs.

8. A non-transitory computer-readable storage medium comprising instructions that, when executed in a computing device, execute a distributed computing application within a virtualized computing environment, by performing the steps of:
instantiating a first plurality of virtual machines (VMs) on a plurality of hosts as data nodes of a first distributed file system,
wherein the data nodes of the first distributed file system are concurrently accessible by a plurality of compute VMs including a first compute VM and a second compute VM,
wherein each compute VM is configured to request and obtain data blocks from one or more of the data nodes of the first distributed file system, the data blocks containing a portion of an input data set, and process the portion of the input data set stored in the first distributed file system,
wherein the first compute VM and the second compute VM are configured to concurrently process respectively a first portion of the input data set and a second portion of the input data set, and
wherein data nodes and compute VMs are separate VMs; and
instantiating a second plurality of VMs on the plurality of hosts as data nodes of a second distributed file system,
wherein data nodes of the second distributed file system are concurrently accessible by a plurality of region server nodes associated with a distributed database application, the plurality of regions server nodes including a first region server node and a second region server node, and
wherein each region server node is a virtual machine configured to request from and obtain data blocks from one or more of the data nodes of the second distributed file system, the data blocks containing a portion of a data table and to perform database operations on the portion of a data table stored in the second distributed file system,
wherein the first region server node and the second region server node are configured to concurrently process respectively a first portion of the data table and a second portion of the data table,
wherein the data nodes and the region server nodes are separate VMs;
wherein each compute VM is coupled to at least one of the plurality of region server nodes for access to a portion of the data table which the at least one of the plurality of region server nodes is configured to serve; and
wherein the access provided by the coupling allows each compute VM to request from and obtain data blocks from one or more of the data nodes of the second distributed file system, the data blocks containing a portion of the data table, and to process as part of the distributed computing application the portion of the data table which the at least one of the plurality of region server nodes is configured to process.

9. The non-transitory computer-readable storage medium of claim 8, wherein the step of instantiating the second plurality of VMs on the plurality of hosts to form the second distributed file system comprises:
instantiating a first VM comprising the first region server node and a first data node executing on the same VM, wherein the first data node is configured to store a portion of the data table associated with the first region server node.

10. The non-transitory computer-readable storage medium of claim 9,
wherein the plurality of compute VMs comprises a first resource pool associated with the distributed computing application, and the second plurality of VMs comprises a second resource pool associated with the distributed database application,
wherein the second resource pool has a higher priority for computing resources than the first resource pool.

11. The non-transitory computer-readable storage medium of claim 8, wherein the step of instantiating the second plurality of VMs on the plurality of hosts to form the second distributed file system comprises:
instantiating a first VM comprising the first region server node; and
instantiating a second VM comprising a first data node configured to store a portion of the data table associated with the first region server node, wherein the first VM and the second VM are executing on the same host.

12. The non-transitory computer-readable storage medium of claim 11,
wherein the plurality of compute VMs comprises a first resource pool associated with the distributed computing application,
wherein the first VM is a member of a second resource pool associated with the distributed database application, and
wherein the second VM is a member of a third resource pool associated with the second distributed file system.

13. The non-transitory computer-readable storage medium of claim 11, further comprising:
responsive to an indication to expand the distributed database application, instantiating a third VM comprising the second region server node; and
responsive to an indication to shrink the distributed database application, powering off the first VM comprising the first region server node.

14. The non-transitory computer-readable storage medium of claim 8, further comprising:
executing an HBase query on at least one of the plurality of region server nodes while concurrently executing a MapReduce job on the plurality of compute VMs.

15. A host computer system for executing a distributed computing application within a virtualized computing environment, the host computer system comprising:
- a storage device having a first virtual disk and a second virtual disk;
- a processor programmed to carry out the steps of:
  - executing a first virtual machine (VM) on the host computer system, wherein the first VM includes the first virtual disk and is one of a plurality of data nodes of a first distributed file system, the plurality of data nodes of first distributed file system being concurrently accessible by a plurality of compute VMs including a first compute VM and a second compute VM,
  - wherein each compute VM is configured to request from and obtain data blocks from one or more of the data nodes of the first distributed file system, the data blocks containing a portion of an input data set, and process the portion of the input data set stored in the first distributed file system, and
  - wherein data nodes and compute VMs are separate VMs;
  - executing, on the host computer system, the first compute VM and the second compute VM, wherein the first compute VM and the second compute VM are configured to concurrently process respectively a first portion of the input data set and a second portion of the input data set stored in the first virtual disk; and
  - executing a third VM on the host computer system,
  - wherein the third VM includes the second virtual disk and is one of a plurality of data nodes of a second distributed file system,
  - wherein the data nodes of the second distributed file system are concurrently accessible by a plurality of region server nodes associated with a distributed database application, the plurality of region server nodes including a first region server node and a second region server node,
  - wherein each region server node is a virtual machine configured to request from and obtain data blocks from one or more of the data nodes of the second distributed file system, the data blocks containing a portion of a data table and to perform database operations on the portion of a data table stored in the second distributed file system,
  - wherein the first region server node and the second region server node are configured to concurrently process respectively a first portion of the data table and a second portion of the data table, and
  - wherein the data nodes and the region server nodes are separate VMs;
  - wherein each compute VM is coupled to at least one of the plurality of region server nodes for access to a portion of the data table which the at least one of the plurality of region server nodes is configured to serve; and
  - wherein the access provided by the coupling allows each compute VM to process the portion of the data table which the at least one of the plurality of region server nodes is configured to serve as part of the distributed computing application.

16. The host computer system of claim 15,
- wherein the third VM comprises the first region server node and a first data node executing on the same VM, and
- wherein the first data node is configured to store a portion of the data table associated with the first region server node.

17. The host computer system of claim 16,
- wherein the first and second compute VMs are members of a first resource pool associated with the distributed computing application, and the third VM is a member of a second resource pool associated with the distributed database application, and
- wherein the second resource pool has a higher priority for computing resources of the host computer system than the first resource pool.

18. The host computer system of claim 15, wherein the processor is further programmed to carry out the steps of:
- executing a fourth VM comprising the first region server node;
- wherein the third VM comprises a first data node configured to store a portion of the data table associated with the first region server node.

19. The host computer system of claim 18,
- wherein the first and second compute VMs comprise a first resource pool associated with the distributed computing application,
- wherein the fourth VM is a member of a second resource pool associated with the distributed database application, and
- wherein the third VM is a member of a third resource pool associated with the second distributed file system.

20. The host computer system of claim 18, wherein the processor is further programmed to carry out the steps of:
- responsive to an indication to expand the distributed database application, instantiating a fifth VM comprising a third region server node configured to store a portion of the data table associated with the first region server node within the third VM; and
- responsive to an indication to shrink the distributed database application, powering off the fourth VM comprising the first region server node.

* * * * *